United States Patent
Gadde et al.

(10) Patent No.: US 7,481,061 B2
(45) Date of Patent: Jan. 27, 2009

(54) FUEL CONTROL FOR STARTING A GAS TURBINE ENGINE

(75) Inventors: Satish B. Gadde, Orlando, FL (US); Damien G. Teehan, St. Cloud, FL (US); Jatinder P. Singh, Orlando, FL (US); Gary Hildebrandt, Orlando, FL (US); Danny W. Kozachuk, Oviedo, FL (US); Joseph L. Kollar, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 623 days.

(21) Appl. No.: 11/272,226

(22) Filed: Nov. 10, 2005

(65) Prior Publication Data
US 2007/0101724 A1 May 10, 2007

(51) Int. Cl.
*F02C 7/26* (2006.01)

(52) U.S. Cl. .......................... 60/778; 60/790
(58) Field of Classification Search .............. 60/39.281, 60/773, 778, 786, 790
See application file for complete search history.

(56) References Cited

U.S. PATENT DOCUMENTS

| | | | |
|---|---|---|---|
| 3,943,371 A | 3/1976 | Yannone et al. | |
| 4,019,315 A | 4/1977 | Yannone et al. | |
| 4,051,669 A | 10/1977 | Yannone et al. | |
| 4,208,591 A | 6/1980 | Yannone et al. | |
| 4,242,592 A | 12/1980 | Yannone et al. | |
| 4,314,441 A | 2/1982 | Yannone et al. | |
| 5,187,936 A * | 2/1993 | Kast et al. | 60/734 |
| 5,983,621 A * | 11/1999 | Stambaugh et al. | 60/773 |
| 6,092,546 A | 7/2000 | Lebrun et al. | |
| 6,357,219 B1 | 3/2002 | Dudd, Jr. et al. | |
| 6,766,647 B2 | 7/2004 | Hartzheim | |
| 6,789,000 B1 | 9/2004 | Munson, Jr. | |
| 6,836,086 B1 | 12/2004 | Goldberg et al. | |
| 6,908,301 B2 | 6/2005 | Yamaguchi et al. | |
| 2003/0056522 A1 | 3/2003 | Hartzheim | |
| 2004/0237538 A1 | 12/2004 | McKelvey et al. | |

* cited by examiner

Primary Examiner—Louis J Casaregola

(57) ABSTRACT

A method of controlling fuel flow to a combustor (18) of a gas turbine engine (10) during startup of the engine includes determining a relationship between $C_v$ and valve position for a flow control valve (e.g., 24) in a fuel supply (20) to the combustor as a function of at least one real time parameter of fuel (30) in the fuel supply. The method also includes determining a value of the at least one parameter of the fuel before initiating a flow of the fuel to the combustor, and then calculating a first actual $C_v$ value for the flow control valve at a target flow rate using the determined value of the parameter. The method then includes positioning the flow control valve to a first position corresponding to the actual $C_v$ value based upon the determined relationship between $C_v$ and valve position, and initiating the flow of fuel to the combustor through the flow control valve.

13 Claims, 2 Drawing Sheets

FUEL CONTROL FOR STARTING A GAS TURBINE ENGINE

FIELD OF THE INVENTION

The present invention relates generally to gas turbine engines, and, more particularly, to controlling a flow of fuel responsive to one or more sensed parameters of the fuel.

BACKGROUND OF THE INVENTION

Gas turbine engines are known to include a compressor for compressing air, a combustor for producing a hot gas by burning fuel in the presence of the compressed air produced by the compressor, and a turbine for expanding the hot gas to extract shaft power. Staging is the delivery of fuel to burners of the gas turbine engine through at least two separately controllable fuel supply systems or stages. Staging is known as a method to control combustion in the combustor. For example, gas turbine engine may use two stages for starting, such as a pilot stage and a main burner, or "A," stage.

Historically, a starting process for gas turbine engines has required that fuel pressure and temperature be confined to respective predetermined ranges for reducing a variation in fuel mass flow to the engine to achieve consistent ignition. Fuel mass flows outside a predetermined range would result in a failed starting attempt. To achieve a pressure of the fuel within its predetermined range, a fuel gas regulator is typically disposed in the main fuel supply path to maintain a desired pressure downstream of the regulator. Although fuel pressure may be controlled in this manner, the fuel gas temperature may not be as easily controlled to ensure the temperature of the fuel is within its required predetermined range for starting. Only when the fuel is within its predetermined range is starting attempted. Consequently, gas turbine ignition settings are required to be modified if there are any changes to the upstream fuel conditions such as temperature, pressure, gas composition.

Gas turbine combustors may be started using a "pop" and "glide" technique for providing an initially richer fuel flow during a pop portion of a starting procedure until the fuel is ignited in the combustor. After ignition is achieved, the pop portion is followed by a leaner fuel flow during a glide portion of the starting procedure until the turbine is ramped up to a desired speed. The pop portion provides a richer fuel condition ensuring successful ignition, while the glide portion provides a slightly leaner fuel condition to avoid higher blade path temperatures during the initial acceleration. The transition from pop to glide is typically accomplished relatively gradual to avoid a flame out condition.

BRIEF DESCRIPTION OF THE DRAWINGS

The invention is explained in following description in view of the drawings that show.

DETAILED DESCRIPTION OF THE INVENTION

Ignition during starting of a gas turbine engine used for power generation is not always guaranteed. While regulating the pressure of a fuel supplied to the engine and providing fuel at a predetermined temperature improves ignition success rates, ignition of such gas turbine engines may only be achievable for about 70% of ignition attempts. The use of different types or grades of fuel and varying fuel temperatures may require time consuming, expensive, manual tuning of the gas turbine parameters before attempting to start the engine. Furthermore, pressure regulators typically used to control a pressure of fuel supplied to the engine may drift over time, resulting in inconsistent fuel pressures supplied by the regulator. The inventors of the present invention have innovatively realized that by monitoring one or more fuel parameters and using the parameter(s) to calculate an actual flow coefficient, Cv, for a fuel flow control valve, and then using the actual flow coefficient to determine an opening position of the valve responsive to the monitored parameter, improved ignition reliability may be achieved. Advantageously, the need for a gas pressure regulator in the fuel supply line to maintain a constant pressure may be eliminated, as gas pressures are monitored in real, or near real time to determine a flow control valve opening position. The invention also may eliminate a need for placing a restriction on the fuel temperature and/or fuel type. In addition, the invention may also eliminate several other fuel gas system components that are conventionally required in a fixed pressure system.

Figure 1:
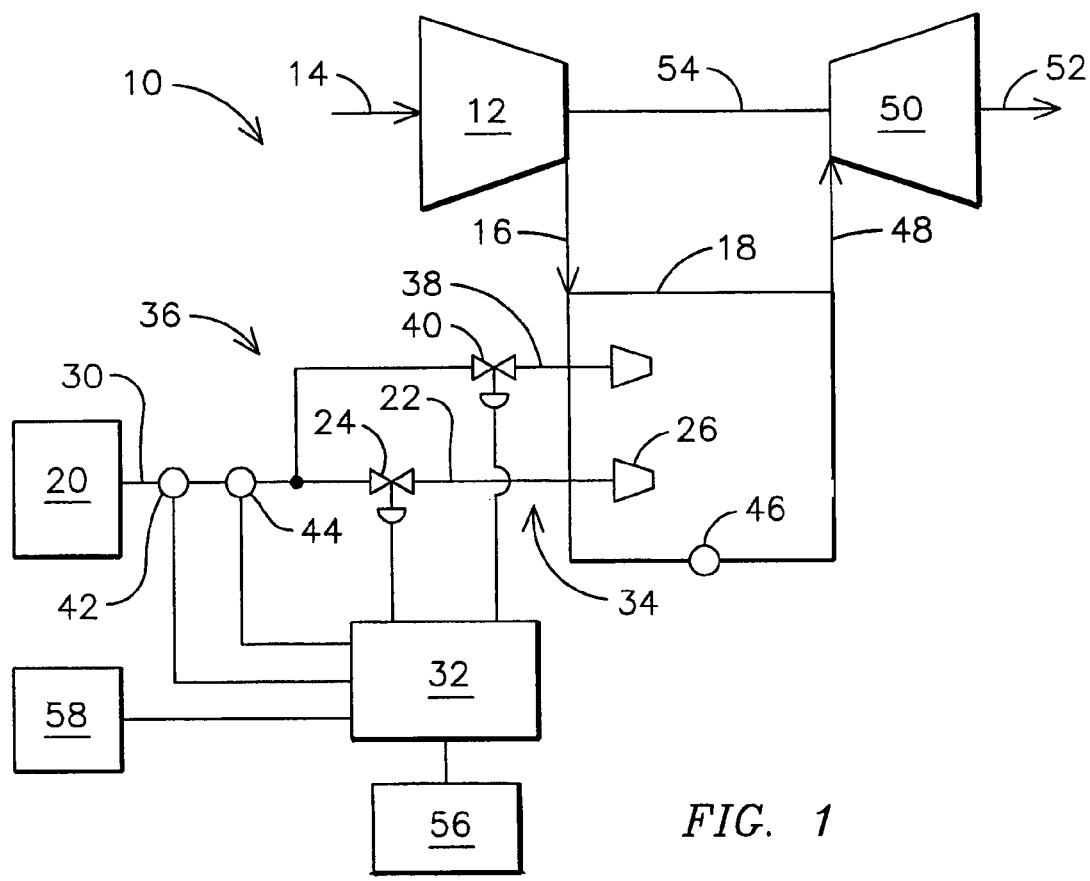
FIG. 1 is a functional diagram of an exemplary embodiment of a gas turbine engine configured for performing an improved starting method.

FIG. 1 shows a gas turbine 10 including a compressor 12 for receiving ambient air 14 and for providing compressed air 16 to a combustor 18. The combustor 18 also receives combustible fuel 30, for example, from a fuel supply 20 along a fuel flow path 22 providing fuel, for example to a first stage 34, such as an "A' stage, of the combustor 18. Flow control valve 24, such as a throttle valve, may be positioned in the fuel flow path 22 to control a fuel flow, such as a mass flow of the fuel 30, delivered along the flow path 22 to the combustor 18. The fuel flow path 22 may include a nozzle 26 disposed at an outlet 28 of the flow path 22. A second fuel flow path 38 may receive a portion of the fuel 30 via flow control valve 40 for fueling a second stage 36, such as a pilot of the combustor 18.

Combustion of the combustible fuel 30 supplied to the combustor 18 in the compressed air 16 results in the supply of hot combustion gas 48 to turbine 50, wherein the hot combustion gas 48 is expanded to recover energy in the form of the rotation of shaft 54 that is used, in turn, to drive the compressor 12. The turbine exhaust 52 is delivered back to the ambient atmosphere.

A controller 32 may be configured to receive inputs from sensors sensing parameters of the gas turbine engine 10 and processing the inputs to implement steps to control positions of the flow control valves 24, 40 to regulate fuel flows therethrough. For example, the controller 32 may control a position of valve 40 based on data provided by the sensors to achieve a desired mass flow of fuel delivered to the combustor 18 during a gas turbine starting process. The controller 32 may take any form known in the art, for example an analog or digital microprocessor or computer, and it may be integrated into or combined with one or more controllers used for other functions related to the operation of the gas turbine engine 10. The steps necessary for such processes may be embodied in hardware, software and/or firmware in any form that is accessible and executable by controller 32 and may be stored on any medium that is convenient for the particular application.

The sensors providing data to the controller 32 may include a temperature sensor 42 and a pressure sensor 44. The temperature sensor 42 and a pressure sensor 44 may be positioned upstream of the control valves 24, 40 to sense parameters, such as a temperature and a pressure respectively, of the fuel 30 being provided to one or more stages 34, 36. A pressure sensor 46 may also be disposed in the combustor 18 to sense a pressure, such as a gas turbine shell pressure, downstream of the nozzle 26.

Figure 3:
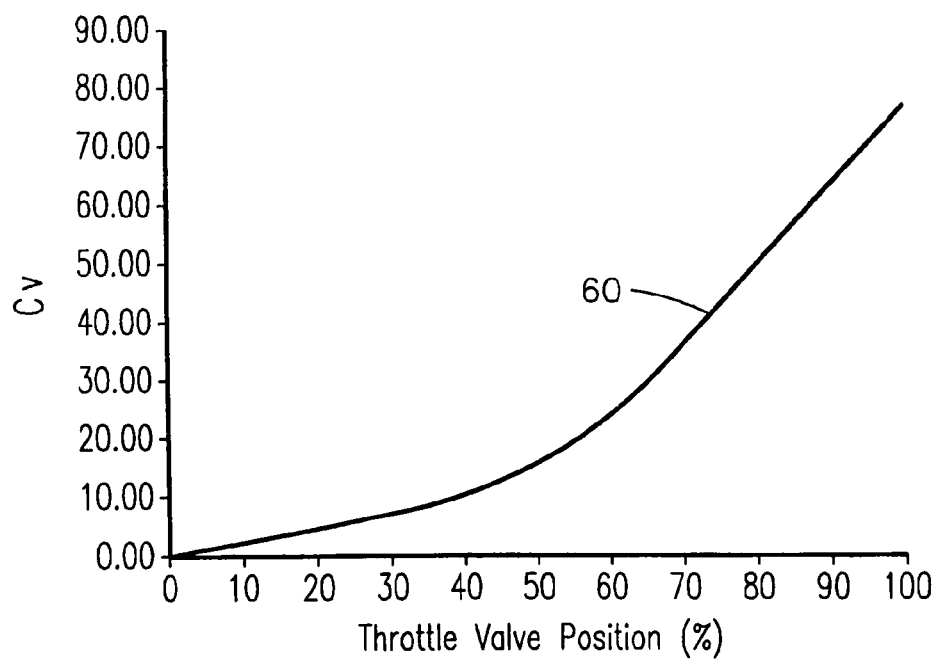
FIG. 3 is a graph of a valve flow characteristic ($C_v$) versus percent opening for an exemplary flow control valve of the type used in a gas turbine engine.

In an aspect of the invention, the controller 32 is configured for controlling fuel flow to the combustor 18 of a gas turbine engine 10 during startup. In an embodiment, the method includes first determining a relationship between a valve flow characteristic (Cv) and valve position for a flow control valve, such as valve 24, controlling a fuel 30 being supplied to the combustor 18. The relationship may be a function of at least one parameter of fuel 30, such as a fuel temperature, a fuel pressure and/or a fuel type from which fuel parameters such as specific gravity of the fuel 30 may be derived. The controller 32 may be in communication with a fuel type module 58 that provides fuel type information corresponding to the present fuel being used to fuel the gas turbine engine 10. For example the fuel type may include a mass spectrometer for analyzing the fuel and providing fuel type information. In an aspect of the invention, controller 32 may in be communication with a memory 56 storing a relationship of Cv versus percent opening for a type of the control valve 24 used in a gas turbine engine 10. These relationships, such as the exemplary relationship depicted in the graph of FIG. 3, are typically provided by a valve manufacturer based on characterizing the flow of a predetermined type of fluid at a predetermined temperature and pressure flowing through the valve. Such relationships may be pre-stored in memory 56 for access by the controller 32.

Before initiating a flow of the fuel, such as a pop flow to the combustor 18, the method includes determining one or more fuel parameter values and then calculating a first actual $C_v$ value for a flow control valve at a target pop flow rate using the determined fuel parameter values. In an aspect of the invention, a real time or near real time measurement of fuel pressure and fuel temperature is used to calculate the first actual $C_v$ value. Fuel type parameters, such as specific heat and molecular weight corresponding to fuel type being used, may also be used in the calculation. In an embodiment, the first actual $C_v$ value may be calculated according to American National Standards Institute/Instrument Society of America (ANSI/ISA) 75.01.01.2002 equation (1):

$$C_v = m/(N_8 * P_1 * Y)((T_1 * Z)/(x * M))^{-1/2}; \quad (1)$$

where:

$F_k = k/1.4$ m=desired mass flow rate as defined for the combustion system (lbm/hr or kg/hr)

$N_8$=Numerical Constant=19.3 (English Units), 94.8 (SI units)

$P_1$=Measured Inlet absolute Pressure (Psia or bar)

$T_1$=Measured inlet absolute Temperature (R or K)

Z=Compressibility Factor (can be set to a constant at ignition)=1.0

M=Molecular Weight of fuel e.g. for Methane=16.9 (value may be determined based on Fuel type)

x=Pressure Differential Ratio (e.g., across nozzle: ΔP/P1)

$Y=1-(x/3*(F_k*X_T))$ (Expansion factor, when $x \geq F_k*X_T$ flow becomes choked across the valve and Y becomes 0.667)

$X_T$=Choke Flow Pressure Differential Ratio Factor (valve characteristic may be iteratively calculated based on valve position)

k=Specific Heat for Fuel Gas (e.g., for Methane:1.32; value may be determined based on fuel type)

$F_k$=Specific Heat Ratio ($k_{FG}/k_{air}$)

After the first actual $C_v$ is calculated, a position of the flow valve to achieve a desired flow may be derived, such as by using a valve flow relationship relating $C_v$ to percent valve opening for the valve being controlled. For example, an appropriate throttle valve position, given as a percent opening of the valve, may determined by selecting the calculated actual Cv value from the y-axis of the graph shown in FIG. 3 and using the characteristic curve 60 to find the corresponding percent valve opening on the x-axis for the calculated Cv value. Table 1 shows exemplary calculations for valve opening positions for a Pilot Stage and a Stage A for a gas turbine engine using the equation (1) to arrive at a actual $C_v$ and the corresponding valve positions for the calculated $C_v$:

TABLE 1

Exemplary Calculations using Equation 1 to Determine a Valve Opening Position

|  | Pilot | Stage A |
|---|---|---|
| m | 2000 | 2200 |
| $N_8$ | 19.3 | 19.3 |
| Y | 0.67 | 0.67 |
| $P_1$ | 464 | 464 |
| T | 57 | 57 |
| $T_1$ | 517 | 517 |
| Z | 1 | 1 |
| $P_{man}$ | 0 | 0 |
| x | 0.668 | 0.376 |
| $F_k$ | 0.935714 | 0.935714 |
| $X_T$ | 0.668 | 0.376 |
| $F_k * X_T$ | 0.625057 | 0.351829 |
| k | 1.31 | 1.31 |
| M | 16.9 | 16.9 |
| $Y_1$ | 0.643766 | 0.643766 |
| Sq. Root Term | 6.767273 | 9.02003 |
| $C_v$ | 2.255764 | 3.307353 |
| Valve Position | 26.50% | 21.00% |

During a starting procedure of the gas turbine 10, a flow of fuel 30 to the combustor 18 may be initiated by opening the appropriate flow control valve to its respective determined valve position corresponding to the actual $C_v$ value.

In a pop and glide starting embodiment of the invention, a glide flow rate may be used to transition from a pop portion of startup to a glide portion of startup. A second actual $C_v$ value for the flow control valve at the glide flow rate may be calculated based on actual fuel parameter values using, for example, equation (1). The fuel parameter(s) may be re-measured and the re-measured values of used for calculating the second actual $C_v$ value. The flow control valve may then be positioned to a second position corresponding to the second actual $C_v$ value, based upon the determined relationship between $C_v$ and valve position, to provide a glide flow of fuel to the combustor 18 through the flow control valve.

In another aspect of the invention, flow through the flow control valve may be monitored and the valve position iteratively adjusted to achieve a desired target flow. A method of adjusting the flow in response to a sensed flow includes measuring an actual mass flow rate of the flow of fuel, such as a glide flow during the glide portion, and then calculating an actual $C_v$ value for the flow control valve using the actual mass flow rate of the fuel. In an embodiment, the mass flow may be determined by measuring a differential fuel pressure across the fuel nozzle, such as nozzle 26, and then calculating the actual mass flow based upon the measured differential pressure according to formulas (2A) for non-choked flow, or (2B) for choked flow, through the flow control valve:

$$m = A_{eff} * P_{man} * \{((2*g_c*y)/(R*T_1*(y-1)))*[((P_2*C)/P_{man})^{2/y} - ((P_2*C)/P_{man})^{(1+y)/y}]\}^{1/2} \quad (2A)$$

$$m = A_{eff} * P_{man} * [((g_c*y)/(R*T_1))*(2/(y+1))^{(y+1)/(y-1)}]^{1/2} \quad (2B)$$

where:

m=actual mass flow through the valve $A_{eff}$=effective area of nozzle $P_2*C$=measured combustor shell pressure $P_{man}$=pressure upstream of nozzle, e.g., in a stage manifold=$P_{nozzle}+P_2*C$ $g_c$=32 (English Units), 10 (SI units)

y=specific heat for fuel (e.g., for methane=1.32)

R=Gas constant (dependent on type of gas, e.g., for methane 91.4 (ft*lbf)/(lb*R) or 492 J/(kg*K))

$T_1$=Measured inlet absolute Temperature (R or K)

The calculated mass flow may be used to calculate an actual $C_v$ based, for example, on the difference of the calculated mass flow and the desired mass flow, to achieve the desired mass flow. The method further includes positioning the flow control valve to a position corresponding to the actual $C_v$ value based upon the determined relationship between $C_v$ and valve position, thereby providing an adjusted glide flow of fuel to the combustor 18 through the control valve responsive to the actual mass flow rate. This process may be iterated in a feedback loop to continually adjust the flow of fuel until achieving a desired mass flow.

Figure 2:
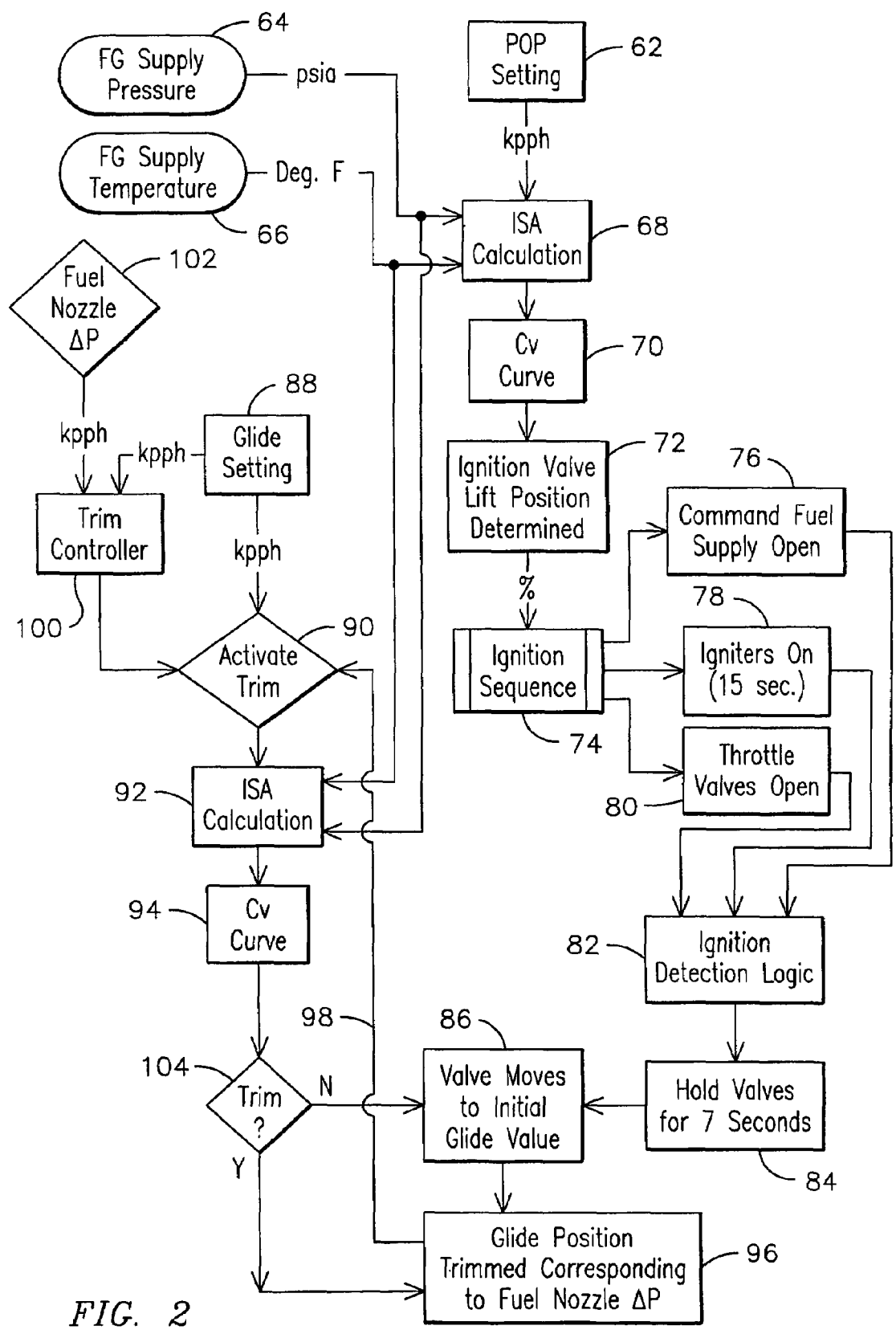
FIG. 2 is a flow diagram showing an exemplary method of performing an improved fuel flow control for starting a gas turbine engine.

FIG. 2 is a flow diagram showing an exemplary method of performing improved fuel flow control using a pop and glide starting technique for a gas turbine engine. The process begins with an initial pop setting 62 for a flow control valve, such as a throttle valve, to deliver a desired mass fuel flow for starting the engine. For example, at sea level conditions, the pop fuel flow may be set to 0.53 kg/s, with 0.25 kg/s (e.g.) to a pilot stage and 0.28 kg/s (e.g.) to a stage A of a combustor. A temperature 66 of the fuel and pressure 64 of the fuel is measured and the respective temperature and pressure are used to calculate an actual $C_v$ 68 for the flow valve using for example, equation (1) above. The actual $C_v$ value is matched against a pre-determined flow valve Cv curve 70, such as shown in FIG. 3, to obtain a flow control valve pop position for ignition based on the measured fuel parameters 72. An ignition sequence 74 is then initiated that may include opening a fuel supply valve 76, turning igniters on 78, and opening the flow control valve 80 to the calculated valve position. When ignition is detected 82, the flow control valve is held at the same pop position 84, for example, 7 seconds, before being transitioned to an initial glide position 86.

An initial glide setting may be implemented in block 88. For example, at sea level conditions, a glide fuel flow may be set to 0.47 kg/s, with 0.25 kg/s (e.g.) to a pilot stage and 0.22 kg/s (e.g.) to stage A of the combustor. The initial glide setting value may be used to calculate a second actual $C_v$ value 92, using, for example, equation 1. A second fuel measurement, such as temperature 66 of the fuel and pressure 64 of the fuel, provided in real time or near real time, (e.g. within 5 seconds) may be used to calculate the second actual $C_v$ value. The second actual $C_v$ value is matched against the pre-determined fuel valve $C_v$ curve 94 to obtain an actual flow control valve position for an initial glide value 86. After the flow control valve is positioned to achieve an initial glide value 86, the position of the flow control valve may be trimmed 96 using feedback loop 98 to activate trimming. When trimming is activated 90, trim controller 100 provides a new mass flow setting for the $C_v$ calculation 92, for example, based on a difference between a desired mass flow being different an actual mass flow derived from a sensed fuel nozzle pressure differential pressure 102. A trim $C_v$ is matched against the pre-determined fuel valve $C_v$ curve 94 to establish a glide trim position of the valve provided via trim decision block 104 to achieve a desired target glide value which may be held for a time period of up to 30 seconds, for example, until control is shifted into an open loop turbine speed ramp-;up mode. Using the above method, a success rate of 98% for over 100 engine starts has been experimentally demonstrated. In addition, it has been experimentally demonstrated that the above method provides lower blade path temperatures and allows lower starting speeds.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

We claim:

1. A method of controlling fuel flow to a combustor of a gas turbine engine during startup of the engine, the method comprising:

determining a relationship between $C_v$ and valve position for a flow control valve in a fuel supply to the combustor as a function of at least one parameter of fuel in the fuel supply;

before initiating a pop flow of the fuel to the combustor, determining a value of the at least one parameter of the fuel;

calculating a first actual $C_v$ value for the flow control valve at a target pop flow rate using the determined value of the at least one parameter;

positioning the flow control valve to a first position corresponding to the first actual $C_v$ value based upon the determined relationship between $C_v$ and valve position; and initiating the pop flow of fuel to the combustor through the flow control valve.

2. The method of claim 1, further comprising:

determining a target glide flow rate to transition from a pop portion of the startup of the engine to a glide portion of the startup;

calculating a second actual $C_v$ value for the flow control valve at the target glide flow rate using the determined value of the measured parameter; and positioning the flow control valve to a second position corresponding to the second actual $C_v$ value based upon the determined relationship between $C_v$ and valve position to provide a glide flow of fuel to the combustor through the control valve.

3. The method of claim 2, further comprising determining a second value of the at least one parameter of the fuel before calculating the second actual $C_v$ value and using the determined second value to calculate the second actual $C_v$ value.

4. The method of claim 2, further comprising:

measuring an actual mass flow rate of the glide flow of fuel;

calculating a third actual $C_v$ value for the flow control valve using the actual mass flow rate; and positioning the flow control valve to a third position corresponding to the third actual $C_v$ value based upon the determined relationship between $C_v$ and valve position to provide an adjusted glide flow of fuel to the combustor through the control valve responsive to the measured actual mass flow rate.

5. The method of claim 4, wherein measuring the actual mass flow rate comprises:
   measuring a differential fuel pressure across a fuel nozzle disposed downstream of the valve; and
   determining the actual mass flow based upon the measured differential pressure.

6. The method of claim 1, wherein the at least one parameter comprises a real-time fuel temperature.

7. The method of claim 1, wherein the at least one parameter comprises a real-time fuel pressure.

8. The method of claim 1, wherein the at least one parameter comprises a fuel type.

9. The method of claim 1, wherein the at least one parameter comprises a plurality of the group of fuel temperature, fuel pressure, and fuel type.

10. The method of claim 1, further comprising
    measuring an actual mass flow rate of the pop flow of fuel;
    calculating a second actual $C_v$ value for the flow control valve using the measured actual mass flow rate; and
    positioning the flow control valve to a third position corresponding to the second actual $C_v$ value based upon the determined relationship between $C_v$ and valve position to provide an adjusted pop flow of fuel to the combustor through the control valve responsive to the measured actual mass flow rate.

11. A method of controlling fuel flow to a combustor of a gas turbine engine during startup of the engine, the method comprising:
    determining a relationship between $C_v$ and valve position for a flow control valve in a fuel supply to the combustor as a function of at least one parameter of fuel in the fuel supply;
    before initiating a flow of the fuel to the combustor, determining an actual value of the at least one parameter of the fuel;
    calculating a first actual $C_v$ value for the flow control valve at a target flow rate using the actual value of the at least one parameter;
    positioning the flow control valve to a first position corresponding to the actual $C_v$ value based upon the determined relationship between $C_v$ and valve position;
    initiating the flow of fuel to the combustor through the flow control valve;
    measuring, after initiating the flow of fuel, an actual mass flow rate of the flow of fuel;
    calculating a second actual $C_v$ value for the flow control valve using the actual mass flow rate; and
    positioning the flow control valve to a second position corresponding to the second actual $C_v$ value based upon the determined relationship between $C_v$ and valve position to provide an adjusted flow of fuel to the combustor through the control valve responsive to the actual mass flow rate.

12. A method of controlling fuel flow to a combustor of a gas turbine engine during startup of the engine, the method comprising:
    determining a relationship between $C_v$ and valve position for a flow control valve in a fuel supply to the combustor as a function a fuel pressure and a fuel temperature in the fuel supply;
    before initiating a pop flow of the fuel to the combustor, determining respective actual values of the fuel pressure and the fuel temperature;
    calculating a first actual $C_v$ value for the flow control valve at a target pop flow rate using the determined actual values of the fuel pressure and the fuel temperature;
    positioning the flow control valve to a first position corresponding to the actual $C_v$ value based upon the determined relationship between $C_v$ and valve position;
    initiating a pop flow of fuel to the combustor through the flow control valve;
    determining a target glide flow rate to transition from a pop portion of the startup of the engine to a glide portion of the startup;
    calculating a second actual $C_v$ value for the flow control valve at the target glide flow rate using the determined actual values of the fuel pressure and the fuel temperature; and
    positioning the flow control valve to a second position corresponding to the second actual $C_v$ value based upon the determined relationship between $C_v$ and valve position to provide a glide flow of fuel to the combustor through the control valve.

13. The method of claim 12, further comprising:
    measuring, after positioning the flow control valve to the second position, an actual mass flow rate of the glide flow of fuel;
    calculating a third actual $C_v$ value for the flow control valve using the actual mass flow rate; and
    positioning the flow control valve to a third position corresponding to the third actual $C_v$ value based upon the determined relationship between $C_v$ and valve position to provide an adjusted glide flow of fuel to the combustor through the control valve responsive to the actual mass flow rate.

* * * * *